Jan. 23, 1945.  R. A. BOERSMA  2,367,657

ATTACHING DEVICE

Original Filed Jan. 17, 1941

Inventor
Reiner A. Boersma
By Liverance & VanAntwerp
Attorneys

Patented Jan. 23, 1945

2,367,657

UNITED STATES PATENT OFFICE 2,367,657

ATTACHING DEVICE

Reemer A. Boersma, Holland, Mich., assignor to Duffy Manufacturing Company, Holland, Mich., a corporation of Michigan Original application January 17, 1941, Serial No. 374,867, now Patent No. 2,358,206, dated September 12, 1944. Divided and this application September 13, 1943, Serial No. 502,141

9 Claims. (Cl. 189—36)

This invention relates to attaching means which are particularly useful and adaptable in securing running board covers to the base or body of a running board, protective shields to fenders on automobiles, and in many other relations where a simple effective rattle-proof attachment of a part is desired. This application is a division from my copending application, Serial No. 374,867, filed January 17, 1941.

With my invention, particularly in connection with the running boards, either those outside of the doors of an automobile or those immediately at the lower portions of the doors and inside the body, it is desirable and is common practice to have a rubber mat generally corrugated or ribbed to cover the running board; and the principal problem heretofore has been to efficiently and economically connect such mat in place and with a secure connection such that there will be no danger of detachment under the relatively rough service to which it is subjected. The rubber mat is ordinarily vulcanized in practice to a sheet metal plate sometimes at the under side of the mat and sometimes interposed within and between the opposed upper and lower sides of the mat. Various bolt and screw attachments and other devices have been used which are awkward to secure in place, time consuming in applying and attaching the mats and which have various other disabilities but which have been used because nothing better has been known.

My invention is concerned with a very practical, simple and effective attaching means which is very readily and economically manufactured and in which the mere application of the mat in place will act to secure the mat effectively, practically and instantaneously without the use of tools. At the same time when the attachment is made danger of rattling is obviated. The attaching means is concealed and is not visible and after the mat is secured in place it presents the appearance at its upper side of an unbroken surface.

The invention is hereinafter more fully described and particularly pointed out in the claims, reference being had to the accompanying drawing, in which, Fig. 1 is an enlarged sectional elevation of the attaching device, partially disassembled.

Like numbers refer to like parts in all the figures.

Figure 1:
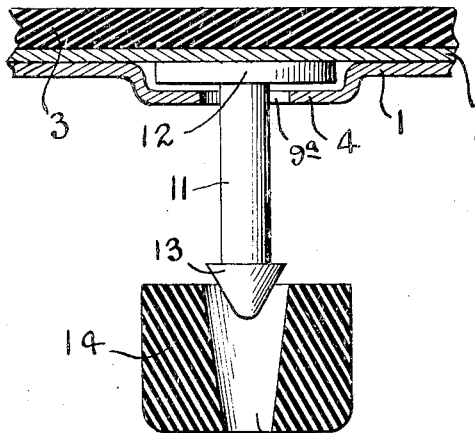

1 represents the plate or body to which the covering device is to be attached and may be the running board, floor, fender or any other portion of the automobile or like device. The covering device has a base 2, preferably of metal which may have attached thereto a surface material 3 such as rubber. The plate 1 may be provided with a depression formed by off-setting the portion 4 thereof as in Figs. 1 and 2 but in any event the plate 1 is provided with an opening 9a or 9d.

Figure 2:
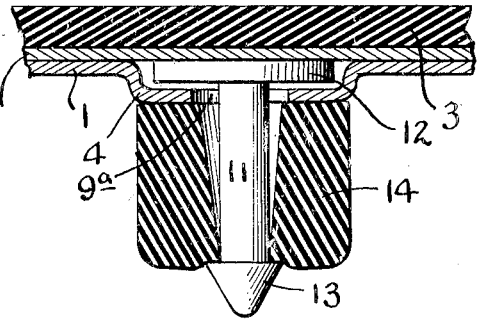
Fig. 2 is a sectional view of the same showing the parts fully assembled.

In the structures of Figs. 1 and 2 a pin 11 is provided which has an enlarged disk shaped flange 12 integral with its upper end and the flange 12 is rigidly connected to the metallic body 2 of the covering device as by welding or other suitable means. The pin 11 projects downwardly through the hole 9a and has a tapered head 13 at its lower end provided with an abrupt shoulder at the point where it joins with the pin 11. A socket 14 is provided made of suitable elastic plastic material such as rubber and the socket has a central opening 6, in most cases extending entirely through the socket, and tapered, its larger end having a diameter as great as the widest diameter of the head 13 and its lower end having a diameter substantially the same as the diameter of the pin 11.

The length of the socket 14 is substantially the same as the distance between the shoulder of the head 13 and the lower side of the plate 1 or the depressed portion 4 thereof and in applying it it is thrust upwardly over the head 13 to surround the pin 11 and its lower end is caused to assume a position above the head 13. In some cases the length of the socket is slightly greater than the distance between the shoulder of the head 13 and the lower part of the plate 1 or depressed portion 4 and in such cases the socket is compressed when it is forced into place and maintains its compressed condition as shown in Fig. 2. In other cases the length of the socket 14 may be substantially the same as the distance from the shoulder of the head 13 and lower part of the plate or it may be slightly less than that distance.

Figure 4:
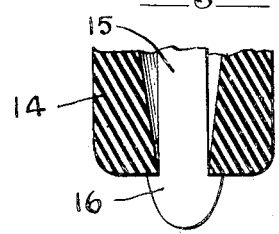
Fig. 4 is a fragmentary transverse section of the lower part of Fig. 3.
Figure 3:
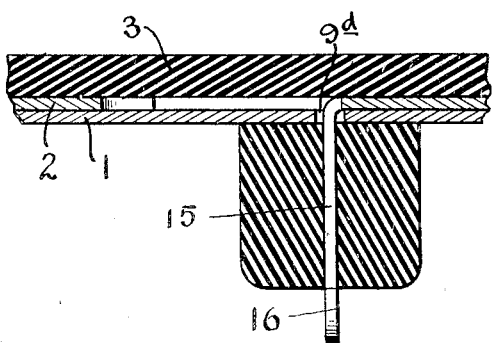
Fig. 3 is a modification in which the attaching pin is struck from and forms an integral part of the base of the covering device.

In the modification of Figs. 3 and 4 the pin 14 is flat and is formed integrally from the metal of the body 2 of the covering device and the enlarged head 16 thereon is also formed integrally with the pin 15 from the metal of said body 2. In this modified structure the opening through the socket may be substantially the same width as the pin 15. In other respects the socket is the same as previously described.

Figure 5:
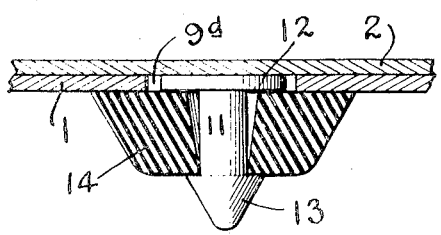
Figs. 5, 6 and 7 are sectional elevations of further modifications of the structure.

In the modification of Fig. 5 there is no depression in the plate 1 surrounding the opening 9d therethrough and the flange 2 at the upper end of the pin 11 is of substantially the same thickness as the plate 1 and lies within the opening 9d. In other respects the structure of this modification is substantially the same as that previously described.

Figure 6:
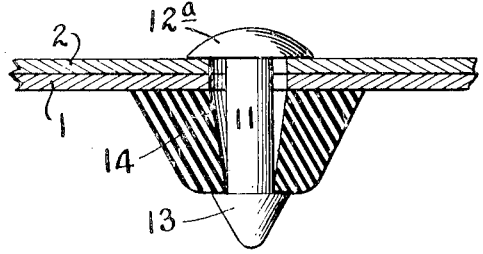

In the modification of Fig. 6 the body 2 of the covering device is also provided with an opening and the flange 12a at the upper end of the pin 11 assumes the shape of a convex head which lies above the body 2. In other respects this modification is the same as previously described.

Figure 7:
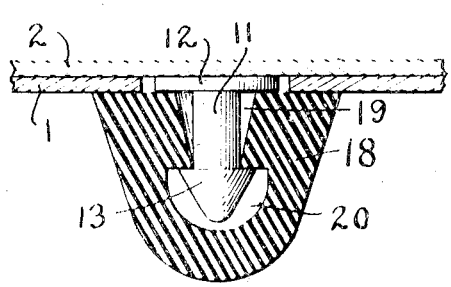

In the modification of Fig. 7 the central opening 19 of the socket 18 does not extend entirely through the socket but terminates in a recess 20 which is sufficiently large to receive the head 13 at the lower end of the pin 11 and the lower end of the socket 18 is closed.

This construction has been fully developed, tested and tried and has been adopted for use in the automotive trade. It is simple, effective, economical and useful. Considerable time is saved in attaching running board covering mats and stone guards in place. The attachment when once made is certain and secure and is not like bolt and nut attachments wherein the nuts used may loosen and at times be lost. The rubber elements used in the attaching device are of utility in deadening and eliminating rattling and other noises.

Although the attachment is of permanent nature it may be disconnected by spreading the flexible socket to permit withdrawal of the head of the pin or the head may be forced out of the socket by application of sufficient force.

The invention is defined in the appended claims and is to be considered comprehensive of all forms of structure coming within their scope.

I claim:

1. The combination with a plate having an opening therein and a covering therefor, of an attaching device comprising a stud attached to said covering device and extending through said opening in said plate, an enlarged head on said stud and a socket of elastic plastic material having an opening therethrough through which said stud extends, said socket being interposed in its entirety between said head and said plate.

2. The elements in combination defined in claim 1 in which there is normally provided a small clearance between said head and said socket.

3. The elements in combination defined in claim 1 in which said socket is normally of greater length than the distance between said plate and said head and said socket is under compression when in assembled position.

4. The elements in combination defined in claim 1 in which the opening through said socket tapers inwardly in a direction away from said covering device and its smaller diameter is substantially equal to the diameter of said stud.

5. The elements in combination defined in claim 1 in which the opening through said socket tapers inwardly in a direction away from said covering device and its smaller diameter is substantially equal to the diameter of said stud, said head being tapered inwardly in a direction away from said covering device and said head having an abrupt shoulder contiguous with said stud.

6. The combination with a plate having an opening therethrough and a covering device therefor, of an attaching device comprising a stud projecting from said covering device and extending through said opening in the plate, an enlarged head on said stud spaced from said plate and a socket of elastic plastic material having an opening therethrough forced over said head and surrounding said stud and interposed in its entirety between said head and said plate.

7. The elements in combination defined in claim 6 in which said socket is normally longer than the distance between said head and said plate and is under compression when in assembled position.

8. The combination with a plate having an opening therein and a covering therefor, of a stud connected with said covering and extending therefrom through the opening in the plate, said stud at its free end having a head with a shoulder at the inner side of the head disposed at right angles to the length of the stud, and a member of elastic compressible material, the length of said member being slightly in excess of the distance between the adjacent side of the plate and the shoulder on said stud, said member having an opening therethrough through which said head of the stud passes, the cross-sectional dimensions of said opening at its outer end being substantially equal to those of the stud and less than those of said shoulder, said member between the plate and said shoulder being held snugly between the plate and said shoulder, as specified.

9. The combination with a plate having an opening therein and a covering therefor, of a cylindrical stud connected with said covering and extending therefrom through the opening in the plate, said stud at its free end having a head of conical form with a base forming a shoulder at the inner side of the head, said shoulder being disposed at right angles to the axis of the stud, and a member of elastic compressible material having an opening therethrough, said stud passing through said opening in the member, the diameter of said opening at its outer end being substantially equal to the diameter of the stud and less than the diameter of the base providing the shoulder on said head, said compressible member being held under continuous pressure between the plate and said shoulder.

REEMER A. BOERSMA.